US008812852B2

(12) United States Patent
Molaro (10) Patent No.: US 8,812,852 B2
(45) Date of Patent: Aug. 19, 2014

(54) METHOD AND SYSTEM FOR MARKING DIGITAL CONTENT

(75) Inventor: Donald Joseph Molaro, Sunnyvale, CA (US)

(73) Assignees: Sony Corporation, Tokyo (JP); Sony Electronics Inc., Park Ridge, NJ (US)

(*) Notice: Subject to any disclaimer, the term of this patent is extended or adjusted under 35 U.S.C. 154(b) by 1012 days.

(21) Appl. No.: 10/392,627

(22) Filed: Mar. 19, 2003

(65) Prior Publication Data

US 2004/0187005 A1    Sep. 23, 2004

(51) Int. Cl.
| | |
|---|---|
| *H04L 9/32* | (2006.01) |
| *H04N 7/167* | (2011.01) |
| *H04N 9/80* | (2006.01) |
| *H04N 5/917* | (2006.01) |
| *G06F 21/00* | (2013.01) |
| *H04N 21/8358* | (2011.01) |
| *H04N 1/32* | (2006.01) |
| *H04N 5/913* | (2006.01) |
| *G06F 21/16* | (2013.01) |
| *G11B 20/00* | (2006.01) |

(52) U.S. Cl.
CPC ....... *H04N 21/8358* (2013.01); *H04N 1/32144* (2013.01); *H04N 5/913* (2013.01); *H04N 2005/91335* (2013.01); *G06F 21/16* (2013.01); *G11B 20/00086* (2013.01); *G11B 20/00289* (2013.01)
USPC ........... 713/176; 380/201; 380/203; 386/260; 386/329; 705/57

(58) Field of Classification Search
CPC .......... H04N 21/8358; H04N 1/32144; H04N 5/913; H04N 2005/91335; G06F 21/16; G11B 20/00086; G11B 20/00289
USPC .......... 713/176, 182, 189, 156; 380/242, 201, 380/202, 239, 241, 203; 726/2, 28, 29; 386/260, 329; 705/57
See application file for complete search history.

(56) References Cited

U.S. PATENT DOCUMENTS

| | | | | |
|---|---|---|---|---|
| 5,774,552 | A  * | 6/1998  | Grimmer | 713/156 |
| 6,285,775 | B1   | 9/2001  | Liu et al. | 382/100 |
| 6,374,036 | B1 * | 4/2002  | Ryan et al. | 386/94 |
| 6,456,725 | B1   | 9/2002  | Cox et al. | 382/100 |
| 6,651,166 | B1 * | 11/2003 | Smith et al. | 713/150 |
| 6,700,989 | B1 * | 3/2004  | Itoh et al. | 382/100 |
| 6,775,392 | B1 * | 8/2004  | Rhoads | 382/100 |
| 6,901,515 | B1 * | 5/2005  | Muratani | 713/176 |
| 6,912,315 | B1 * | 6/2005  | Wong et al. | 382/232 |

(Continued)

FOREIGN PATENT DOCUMENTS

EP    1 006 730    6/2000    ......... H04N 7/26

OTHER PUBLICATIONS

Dittmann et al. "Robust MPEG Video Watermarking Technologies" ACM Multimedia '98 pp. 71-80.

(Continued)

*Primary Examiner* — Aravind Moorthy
(74) *Attorney, Agent, or Firm* — John L. Rogitz (57) ABSTRACT

In one embodiment, a request to deliver a piece of digital content to a recipient is received. In response to the request, a datum is embedded in an equivalent piece of digital content that identifies the recipient. The equivalent piece of digital content is then delivered to the recipient.

36 Claims, 6 Drawing Sheets

(56) References Cited

U.S. PATENT DOCUMENTS

| | | | |
|---|---|---|---|
| 6,912,512 B2* | 6/2005 | Miyazaki et al. | 705/51 |
| 7,020,304 B2* | 3/2006 | Alattar et al. | 382/100 |
| 7,046,916 B1* | 5/2006 | Morris et al. | 386/329 |
| 2001/0051996 A1 | 12/2001 | Cooper et al. | 709/217 |
| 2002/0046178 A1* | 4/2002 | Morito et al. | 705/51 |
| 2002/0052885 A1* | 5/2002 | Levy | 707/200 |
| 2002/0144153 A1* | 10/2002 | LeVine et al. | 713/201 |
| 2002/0178368 A1* | 11/2002 | Yin et al. | 713/186 |
| 2002/0188840 A1* | 12/2002 | Echizen et al. | 713/153 |
| 2003/0103645 A1* | 6/2003 | Levy et al. | 382/100 |
| 2003/0138127 A1* | 7/2003 | Miller et al. | 382/100 |
| 2004/0111526 A1* | 6/2004 | Baldwin et al. | 709/231 |
| 2005/0175179 A1* | 8/2005 | Kesal et al. | 380/266 |

OTHER PUBLICATIONS

Schneier, B. :Applied Cryptography: 1996 John Wiley and Sons, second Edition, pp. 31-32.

* cited by examiner

METHOD AND SYSTEM FOR MARKING DIGITAL CONTENT

FIELD OF THE INVENTION

The present invention relates to the field of digital content distribution. More specifically, embodiments of the present invention are directed to a method for marking a piece of digital content and the recipient of that piece of digital content.

BACKGROUND OF THE INVENTION

The protection of intellectual property rights has become increasingly important to the entertainment industry due to the increased use of consumer electronic devices. While these electronic devices have opened new channels of distribution of content (e.g., music, television programming, movies, etc.), they have also increased the possibility of unauthorized copy and distribution of that content. While content providers want to distribute their content to the widest possible audience, they also want to limit access to this content, if possible, to authorized users only. As a result, content providers seek methods for protecting their intellectual property rights that are not excessively inconvenient for authorized end users.

Digital media offer several advantages over analog media such as high quality, easy editing, and high fidelity copying. As a result, digital electronic devices are increasingly popular with consumers. However, the ease with which high quality copies of digital information can be duplicated and distributed has led to the development of a variety of tools for the protection of intellectual property rights. Digital watermarking is a process that adds data, called a watermark, into a digital object such that the watermark can later be extracted or detected to make an assertion about the object. Digital watermarking is frequently used to identify a copyright holder or to verify the integrity of a digital object.

The process for digitally watermarking a movie requires a substantial amount of computer processing. Typically, each frame in a piece of digital content is watermarked to provide the greatest amount of copyright protection to a digital content provider. Because this is a lengthy process, performing the watermarking process upon the piece of digital content may require a substantial allocation of time and/or computing resources. Another shortcoming of conventional watermark processing is that it is difficult for content providers to identify end users who violate the content providers' copyright privileges.

The Internet is increasingly being used as a distribution medium for entertainment content such as movies, music, or other multi-media presentations. At one time, it was predicted that a user would be able to order digital content (e.g., a movie) over the Internet and have it streamed in real-time to their computer. However, systems having sufficient computing capacity to provide an acceptable level of real-time streaming video performance have proven to be too expensive for most users. Additionally, Internet capacity for providing wide scale delivery of streaming video content is, at this time, insufficient. In order to allow distribution of digital content over the Internet, content providers typically rent the content to end users for a specified time period and allow the end users to store the content upon their personal computers so that they can access the digital content later.

Unfortunately, storing digital content upon a user's computer facilitates unauthorized distribution of copies of copyrighted material. For example, a user can easily copy the digital content and inappropriately distribute it over the Internet. Even if the content is encrypted, it can still be stored by the end user. Additionally, to some degree, all encryption is fallible and does not guarantee that an end user could not eventually decrypt, copy, and distribute the content. This could potentially cause copyright holders to lose revenue. Recent court cases show that the entertainment industry is intent upon preventing unauthorized access and copying of their property. At the same time, they want to facilitate distribution of their content to as wide an audience as possible. Therefore, copyright holders are looking for methods of delivering high quality content over the Internet that still protect their copyright privileges.

SUMMARY OF THE INVENTION

Accordingly, a need exists for a method that allows a content provider to embed within a piece of digital content the information identifying an end user who is authorized to access that piece of digital content. An additional need exists for a method that, while meeting the above stated need, facilitates delivery of the piece of digital content to the end user in a timely manner. Furthermore, while meeting the above stated needs, it is desirable that such a method includes security measures to protect against removing the embedded information from the piece of digital content.

In one embodiment of the present invention, a request for a piece of digital content is received. In response to the request, a datum is embedded in an equivalent piece of digital content that identifies the recipient. The equivalent piece of digital content is then delivered to the recipient.

The following example shows how an embodiment of the present invention may be used to implement marking a piece of digital content in accordance with embodiments of the present invention. An end user orders a piece of digital content from a content provider that will be downloaded via the Internet into the recipient's computer. The identity of the recipient is established by using a digital certificate that is issued by a trusted certificate authority. The content provider, embeds a digital watermark that identifies the recipient within a copy of the piece of digital content. The digital watermark is embedded into a single intra frame (I-frame) of the digital content by re-coding the data contained in that frame. The subsequent predicted frames (P-frames) and bi-directional frames (B-frames) that are used in to describe changes in the preceding I-frame are also re-coded and inserted into the copy of the piece of digital content. The re-coded frames are then inserted into the piece of digital content to create a piece of digital content that is equivalent to the requested piece of digital content. The equivalent piece of digital content comprises the original piece of digital content and the embedded watermark that identifies the recipient. The digital watermark can be embedded into the equivalent piece of digital content in such a way that it is not readily detected by the recipient. In one embodiment, the digital watermark is encrypted using the public key associated with the recipient's digital certificate. The equivalent piece of digital content is then delivered to the recipient.

Thus, embodiments of the present invention establish a one to one relationship between a piece of digital content and an end user who is authorized to use that piece of digital content. Furthermore, by not requiring the re-coding of the entire piece of digital content, the present invention facilitates delivery of the digital content to the end user in a timely manner. Finally, the present invention includes security measures that make it more difficult to detect and remove the digital watermark from the piece of digital content.

BRIEF DESCRIPTION OF THE DRAWINGS

The accompanying drawings, which are incorporated in and form a part of this specification, illustrate embodiments of the present invention and, together with the description, serve to explain the principles of the invention. Unless specifically noted, the drawings referred to in this description should be understood as not being drawn to scale.

DETAILED DESCRIPTION OF THE PREFERRED EMBODIMENT

Reference will now be made in detail to embodiments of the present invention, examples of which are illustrated in the accompanying drawings. While the present invention will be described in conjunction with the following embodiments, it will be understood that they are not intended to limit the present invention to these embodiments alone. On the contrary, the present invention is intended to cover alternatives, modifications, and equivalents which may be included within the spirit and scope of the present invention as defined by the appended claims. Furthermore, in the following detailed description of the present invention, numerous specific details are set forth in order to provide a thorough understanding of the present invention. However, embodiments of the present invention may be practiced without these specific details. In other instances, well-known methods, procedures, components, and circuits have not been described in detail so as not to unnecessarily obscure aspects of the present invention.

NOTATION AND NOMENCLATURE

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signal capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "receiving," "embedding," "delivering," "performing," "re-encoding," "confirming," "encrypting," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
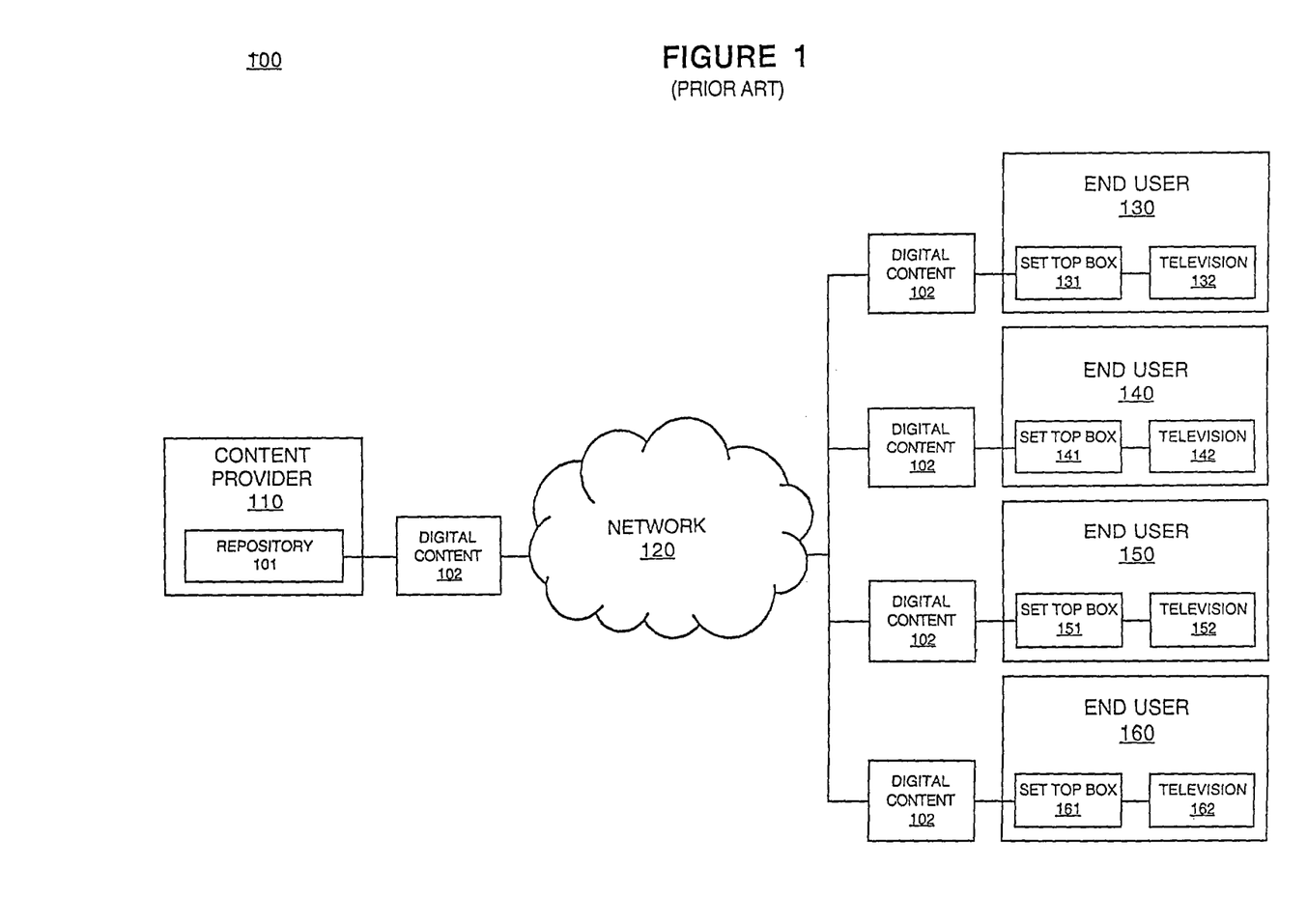
FIG. 1 shows an exemplary prior art content distribution system in which digital watermarking is used to identify content.

FIG. 1 shows an exemplary prior art content distribution system 100 in which digital watermarking is used to identify content. A content provider 110 maintains digital content, for example a movie, in a repository 101. The digital content 102 is distributed via a network 120, for example a cable network provider, to a plurality of end users (e.g., end users 130, 140, 150, and 160). Typically, the movie is distributed as a digitally encoded signal. The signal is received as an input into a set top box (e.g., set top boxes 131, 141, 151, and 161) at each of the end user's homes, converted into an analog signal, and output to the end user's television (e.g., televisions 132, 142, 152, and 162).

The set top boxes perform a digital watermarking process upon the content before it is output as an analog signal to the televisions. Thus, if an unauthorized copy of the content is created by one of the end users, the watermark can be used to determine which user created the unauthorized copy. For example, each of the set top boxes may be assigned a unique identification number which is used in the watermarking process to identify the set top box from which unauthorized copies were made. In distribution system 100, neither the content provider nor the network provider watermarks the digital content before sending it to the end users because an identical copy of the content is sent to each end user. Thus, a watermark added by the content provider 110 or the network provider 120 would be seen at each of the end users' residences and not facilitate identifying the particular end user who created unauthorized copies.

Figure 2:
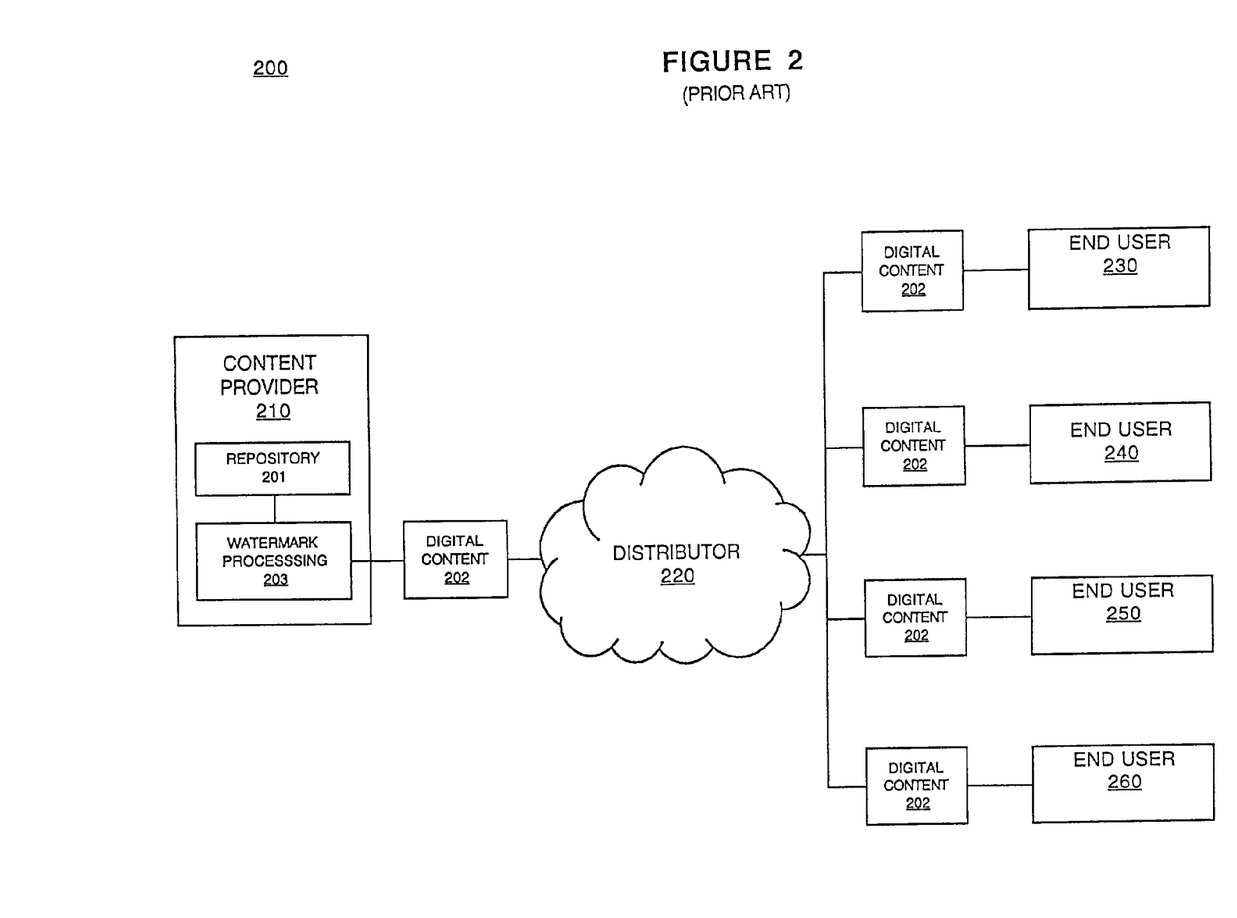
FIG. 2 shows an exemplary prior art content distribution system in which digital watermarking is used to identify content.

FIG. 2 shows an exemplary prior art content distribution system 200 in which digital watermarking is used to identify content. In FIG. 2, content provider 210 maintains digital content (e.g., a movie or music) upon repository 201. A piece of digital content 202 undergoes watermark processing 203 prior to releasing the piece of digital content 202 via distributor 220. Typically, the piece of digital content is then purchased by end users (e.g., end users 230, 240, 250, and 260). As an example, the piece of digital content 202 may be a movie that is being commercially distributed as a digital versatile disk (DVD). The watermarking processing 203 is typically used to differentiate whether an image has been altered or copied without authorization.

Figure 3:
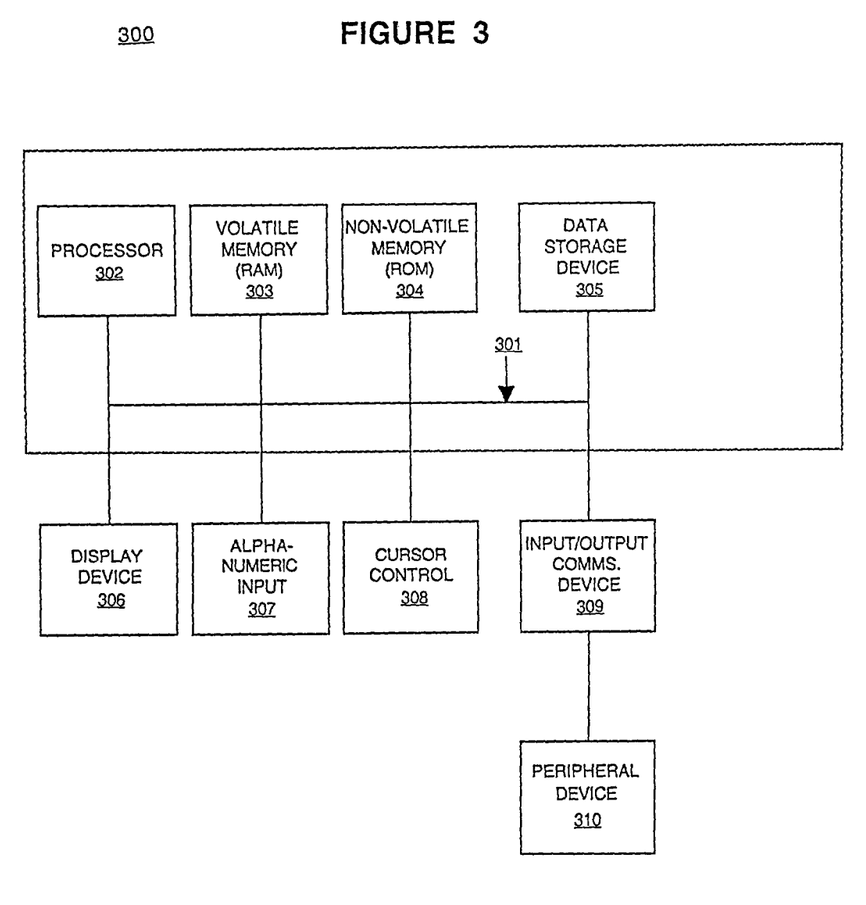
FIG. 3 is a block diagram of an exemplary computer system upon which embodiments of the present invention may be utilized.

With reference to FIG. 3, portions of the present invention are comprised of computer-readable and computer-executable instructions that reside, for example, in computer system 300 which is used as a part of a general purpose computer network (not shown). It is appreciated that computer system 300 of FIG. 3 is exemplary only and that the present invention can operate within a number of different computer systems including general-purpose computer systems, embedded computer systems, laptop computer systems, hand-held computer systems, and stand-alone computer systems.

In the present embodiment, computer system 300 includes an address/data bus 301 for conveying digital information between the various components, a central processor unit (CPU) 302 for processing the digital information and instructions, a volatile main memory 303 comprised of volatile random access memory (RAM) for storing the digital information and instructions, and a non-volatile read only memory (ROM) 304 for storing information and instructions of a more permanent nature. In addition, computer system 300 may also include a data storage device 305 (e.g., a magnetic, optical, floppy, or tape drive or the like) for storing vast amounts of data. It should be noted that the software program for performing a method for marking digital content of the present invention can be stored either in volatile memory 303, data storage device 305, or in an external storage device (not shown).

Devices which are optionally coupled to computer system 300 include a display device 306 for displaying information to a computer user, an alpha-numeric input device 307 (e.g., a keyboard), and a cursor control device 308 (e.g., mouse, trackball, light pen, etc.) for inputting data, selections, updates, etc. Computer system 300 can also include a mechanism for emitting an audible signal (not shown).

Returning still to FIG. 3, optional display device 306 of FIG. 3 may be a liquid crystal device, cathode ray tube, or other display device suitable for creating graphic images and alpha-numeric characters recognizable to a user. Optional cursor control device 308 allows the computer user to dynamically signal the two dimensional movement of a visible symbol (cursor) on a display screen of display device 306. Many implementations of cursor control device 308 are known in the art including a trackball, mouse, touch pad, joystick, or special keys on alpha-numeric input 307 capable of signaling movement of a given direction or manner displacement. Alternatively, it will be appreciated that a cursor can be directed an/or activated via input from alpha-numeric input 307 using special keys and key sequence commands. Alternatively, the cursor may be directed and/or activated via input from a number of specially adapted cursor directing devices.

Furthermore, computer system 300 can include an input/output (I/O) signal unit (e.g., interface) 309 for interfacing with a peripheral device 310 (e.g., a computer network, modem, mass storage device, etc.). Accordingly, computer system 300 may be coupled in a network, such as a client/server environment, whereby a number of clients (e.g., personal computers, workstations, portable computers, minicomputers, terminals, etc.) are used to run processes for performing desired tasks (e.g., receiving, embedding, delivering, performing, re-encoding, confirming, encrypting, etc.). In particular, computer system 300 can be coupled in a system for marking digital content.

Figure 4:
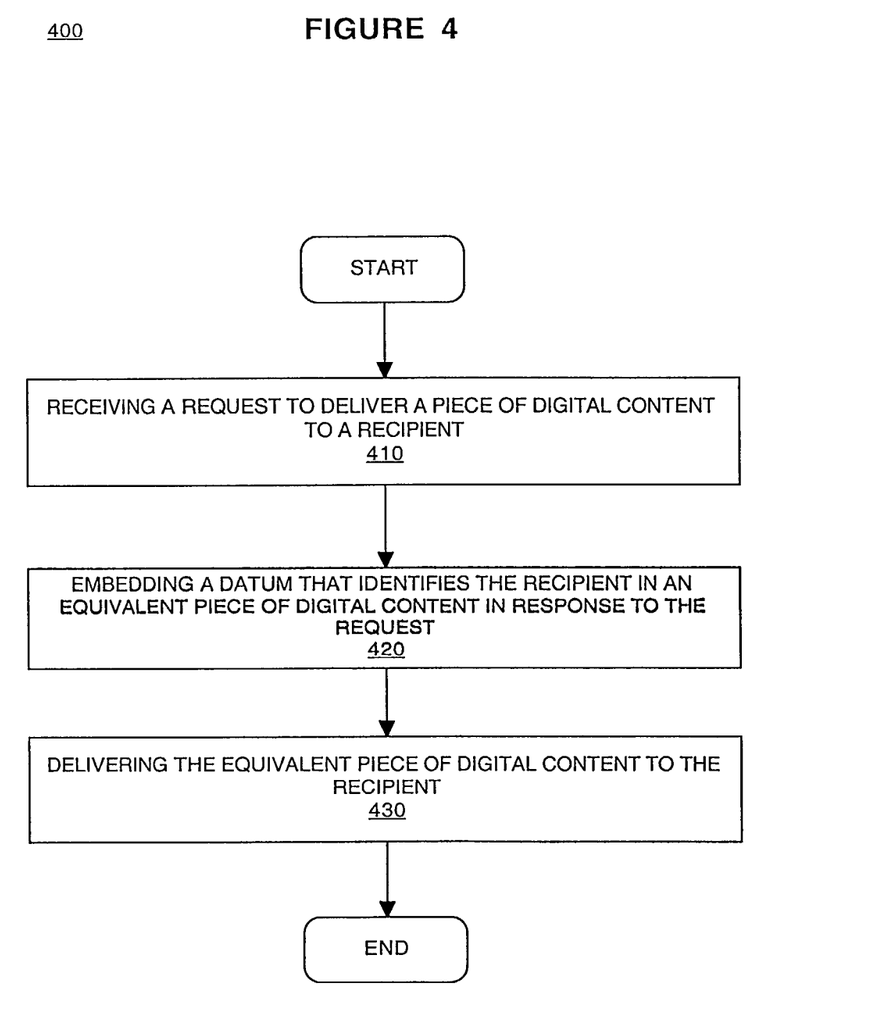
FIG. 4 is a flowchart of a method for marking digital content in accordance with embodiments of the present invention.
Figure 5:
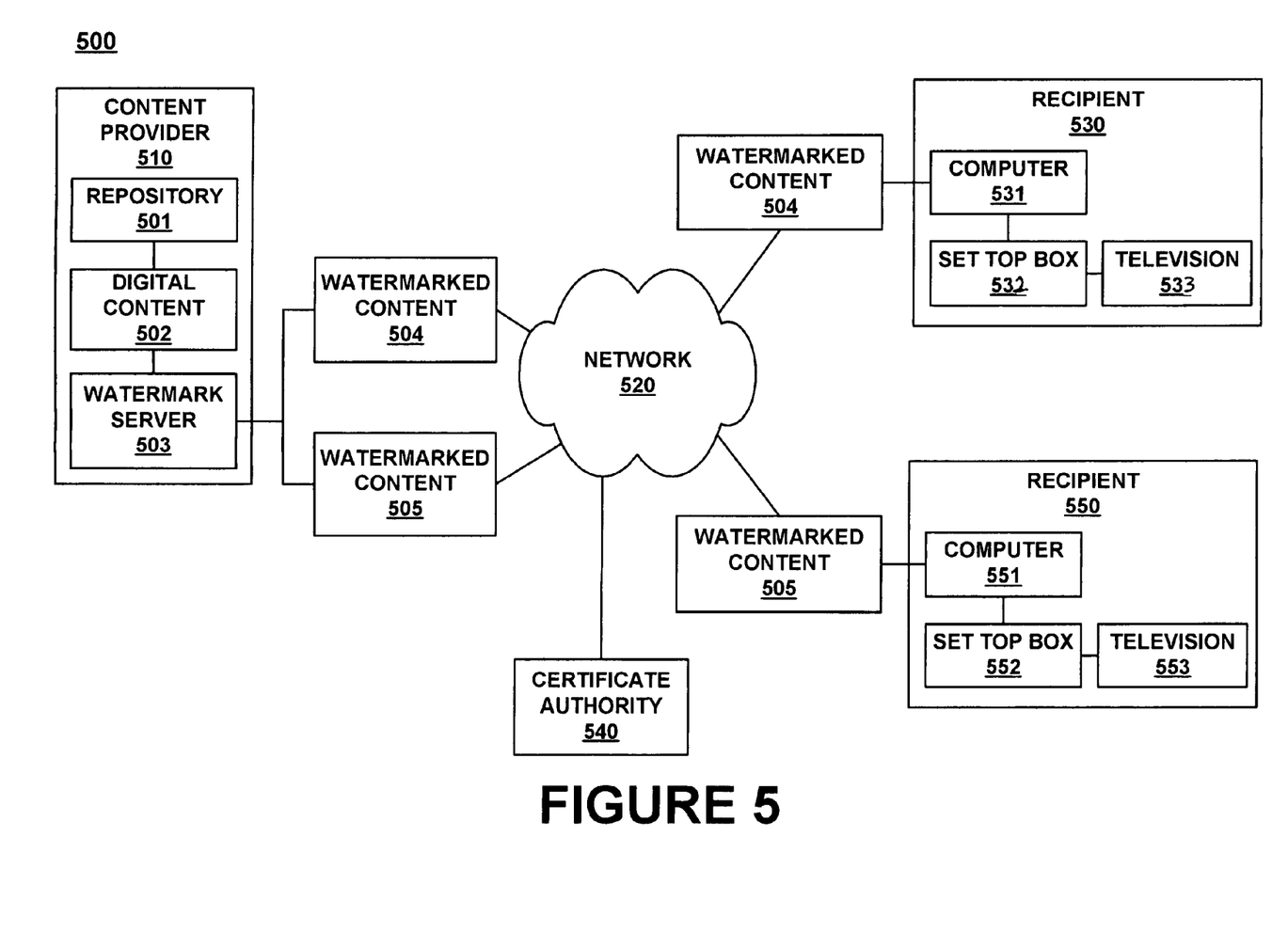
FIG. 5 shows an exemplary content distribution system that uses digital watermarking to identify content in accordance with embodiments of the present invention.

For purposes of clarity, the following discussion will utilize FIG. 5 in conjunction with flowchart 400 to clearly describe the present invention. FIG. 4 is a flowchart of a method 400 for marking digital content in accordance with embodiments of the present invention. FIG. 5 shows an exemplary content distribution system 500 for delivering digital content in accordance with embodiments of the present invention. In step 410, a request is received to deliver a piece of digital content to a recipient.

There are a variety of methods for a recipient to convey a request for a piece of digital content in various embodiments of the present invention. In FIG. 5, recipient 530 is coupled with a content provider 510 via a network 520. Network 520 is used to convey requests from recipient 530 to the content provider 510 and/or for conveying requested digital content to the recipient 530. Thus, the network 520 may comprise an Internet connection, a cable television network provider, a postal network, etc. Referring again to step 410 of FIG. 4, the recipient 530 requests a piece of digital content (e.g., digital content 502) via the Internet (e.g., network 520).

In embodiments of the present invention, when a recipient requests a piece of digital content from a content provider 510, the recipient's identity is confirmed using a digital certificate. Digital certificates are digital documents issued by a certificate authority (e.g., certificate authority 540 of FIG. 5) that establish the credentials of entities doing business or other transactions on an Internet. Digital certificates attest to the binding of a public key, used for encrypting messages and digital signatures, to an individual or other entity. The digital certificates typically contain the certificate holder's name, a certificate serial number, expiration dates, a copy of the certificate holder's public key, and the digital signature of the certificate-issuing authority so that a recipient can verify that the certificate originated from a trusted party. Digital certificates can be kept in registries so that trusted users can look up other users' public keys.

A trust relationship is established between each recipient (e.g., recipient 530) and content provider 510. Certificate authority 540 establishes a known trust with both content provider 510 and with recipient 530. Because both parties trust certificate authority 540, an implied trust is established between content provider 510 and the recipient 530. In embodiments of the present invention, a digital certificate compliant with the X.509 standard is used by certificate authority 540 to establish trust between the recipient 530 and content provider 510.

In embodiments of the present invention, each playback device used by a recipient (e.g., set top box 532) is issued a separate digital certificate. For example, the set top box 532 may be provided with a signed digital certificate when it is manufactured. As stated above, digital certificates can be kept in registries so that authenticating users can look top the other users' public keys. Thus, in embodiments of the present invention, content provider 510 maintains a database for associating the digital certificates each of the set top boxes that will be used to access digital content.

In step 420 of FIG. 4, a datum that identifies the recipient 530 is embedded in an equivalent piece of digital content in response to the request. Throughout this description, the term "equivalent piece of digital content" means a piece of digital content that satisfies a request for digital content. Referring again to FIG. 5, the piece of digital content 502 is sent to watermark server 503. The watermark server 503 creates an equivalent piece of digital content (e.g., watermarked content 504 of FIG. 5) comprising a copy of digital content 502 in which a digital watermark that identifies recipient 530 is embedded.

Watermarking can be described as a process that embeds data called a watermark, digital signature, tag, or label into a multimedia object such that the watermark can be detected or extracted later to make an assertion about the object. There are a variety of digital watermarking processes that can be used in embodiments of the present invention. In the present invention, the embedded digital watermark identifies the particular recipient that will receive the equivalent piece of digital content. Referring to FIG. 5, a digital watermark that is unique to recipient 530 is embedded in a copy of digital content 502 to create watermarked content 504. Similarly, a different digital watermark is embedded into a copy of digital content 502 that identifies the recipient 550 to create watermarked content 505. Thus, a uniquely marked copy of the digital content 502 is created for each recipient. Because the identity of the recipient has been verified by a trusted party (e.g., certificate authority 540 of FIG. 5) the content provider 510 can create a digital watermark that identifies each of the recipients and embed that data within their respective copy of digital content. The digital watermark that is embedded into the digital content may be encoded using the public key of the recipient in embodiments of the present invention to hinder efforts to remove the digital watermark from the digital content. Additionally, the digital watermark can be embedded into the digital content such that it is not readily detected by the recipient.

In one embodiment, digital content 502 is video content such as a movie. However, while the present embodiment recites video content, the present invention is well suited to other forms of digital content such as, for example, digital audio content, digital images, and/or digital text. A typical digital video stream utilizes a video compression format in compliance with specifications developed by the Moving Picture Expert Group (MPEG). MPEG video compression is used in many current and emerging applications such as digital television set-top boxes, digital versatile disks (DVDs), video conferencing, Internet video, high definition television (HDTV) decoders, etc. These applications benefit from video compression in that they require less storage space for archived video information and less bandwidth for the transmission of video information from one point to another.

One reason why the MPEG specification is able to compress data is that it is based on the premise that, in most cases, consecutive video frames are very similar except for small changes to objects that have moved within the frames. Thus, MPEG video compression utilizes intra coded frames (I-frames) that comprise a complete picture that do not reference any other frame in the sequence. Following the I-frame is, usually, at least one predicted frame (P-frame) that simply describes changes that have occurred from the preceding frame. In other words, the only data that is stored in a P-frame is the differences between the P-frame and the I-frame it is based upon. For example, to depict a bouncing ball, the I-frame contains all of the data that the MPEG decoder needs to render a picture of a ball. The subsequent P-frame contains information describing how the position of the ball has changed from the preceding I-frame. Storing differences between frames facilitates substantial reduction in the amount of information needed to reproduce a sequence.

A P-frame may also be based upon a preceding P-frame. Thus, a series of frames in an MPEG stream may be described as:

I P P P I P P P I where I represents an I-frame and P represents a P-frame. Typically, only a few P-frames are allowed in succession before a new I-frame is introduced since a small margin of error in introduced in each new P-frame.

A bi-directional frame (B-frame) may also be included in the MPEG stream. B-frames are coded as differences from the last or the next I or P frame. A series of frames in an MPEG stream using B-frames may be described as:

I B P B P B P B P I or
I B B P B B P B B P I where I represents an I-frame, P represents a P-frame, and B represents a B-frame. Because no frame is based solely on a B-frame, they do not propagate errors like P-frames.

To embed a watermark into an MPEG stream, the digital watermark is first embedded into an I-frame. The subsequent P-frames and B-frames must then be re-coded to account for the changed I-frame. Re-coding digital video content is a complicated and time consuming process. This is problematic for a content provider that is trying to deliver digital content using, for example, the Internet because the recipient is expecting a short delay between the time the content is ordered and its delivery. Thus, for a content provider to re-code an entire movie and deliver it in real time over the Internet or a cable television network would require that a content provider invest in a substantial amount of computing hardware.

In embodiments of the present invention, digital watermarks are embedded in only a few of the I-frames in the digital content 502 rather than all of them. For example, a digital watermark could be embedded in, for example, every 50th I-frame of the MPEG stream. This reduces the amount of re-coding of the digital content that has to be performed, thus reducing the amount of time required to deliver the digital content to a recipient. However, the present invention could, for example, embed a digital watermark in as few as a single I-frame in the MPEG stream if that I-frame is followed by another I-frame that is not watermarked.

Referring again to FIG. 4, in step 430 the equivalent piece of digital content 504 is delivered to the recipient 530. Watermarked content 504 is delivered via the Internet (e.g., network 520) to recipient 530. Again, it is appreciated that the watermarked content 504 can be delivered to the recipient using a network other than the Internet such as the postal service or a cable television network. In embodiments of the present invention, the watermarked content (e.g., watermarked content 504) may be encrypted prior to delivering it to recipient 530.

In the embodiment of FIG. 5, the watermarked content 504 is stored using a computer 531 of the recipient 530 who can then replay the content using set top box 532 and television 533. Similarly, a watermarked content 505 is delivered to the recipient 550. Watermarked content 505 may comprise a copy of the same digital content as watermarked content 504. However, the digital watermark embedded into watermarked content 505 identifies recipient 550 as the recipient of the content.

Embodiments of the present invention are advantageous because they facilitate embedding data into a piece of digital content that identifies the recipient of that piece of digital content. Additionally, because only a few of the frames are re-coded with the watermark, the present invention facilitates delivering the digital content to the recipient more quickly than conventional methods. For example, a recipient could request a piece of digital content using a menu displayed upon his/her television (e.g., from their cable television service provider) or computer and receive the piece of digital content in a few minutes. This is not currently possible if every frame in the MPEG stream is re-coded to include the embedded watermark.

Because the content provider 510 can identify the recipient of each copy of digital content it distributes, the copyright privileges of content provider 510 are better protected against unauthorized copy and distribution of intellectual property. If content provider 510 later discovers an unauthorized copy of digital content 502 that is being distributed, they can use the digital watermark to identify the recipient of the particular copy of the digital content from which copies were made. For example, content provider 510 can extract the embedded watermark that identifies recipient 530, determine that recipient 530 is not authorized to copy the digital content, and use this information to prosecute the recipient 530 for unauthorized copying and distribution of digital content 502.

Figure 6:
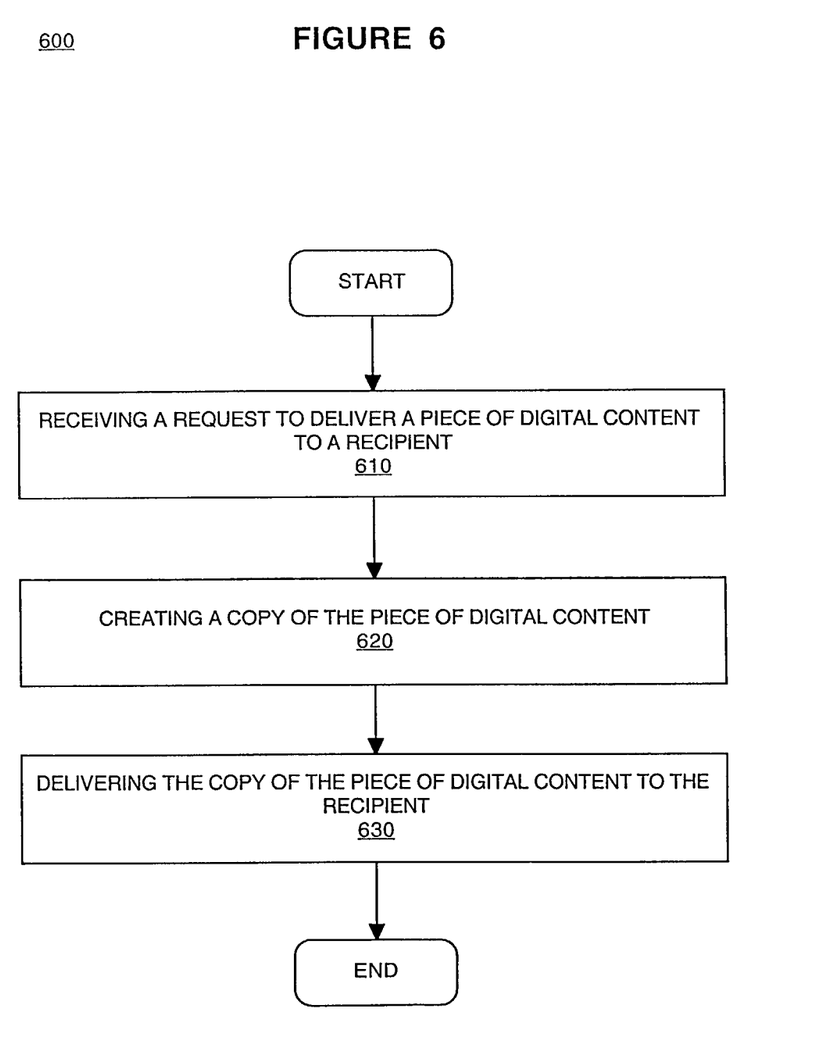
FIG. 6 is a flowchart of a method for marking digital content in accordance with embodiments of the present invention.

FIG. 6 is a flowchart of a method 600 for marking digital content in accordance with embodiments of the present invention. In step 610 of FIG. 6, a request is received to deliver a piece of digital content to an ultimate recipient of the digital content. As discussed above, a recipient (e.g., recipient 530 or 550 of FIG. 5) can convey a request for digital content to a content provider (e.g., content provider 510 of FIG. 5) via a network (e.g., network 520 of FIG. 5). In one embodiment, network 520 comprises the Internet. However, a request for a piece of digital content can be conveyed by a network other than the Internet in embodiments of the present invention. The request for digital content also comprises information verifying the identity of the recipient. This may comprise a digital certificate that is substantially compliant with the X.509 standard and is issued by a trusted authenticating party (e.g., certificate authority 540 of FIG. 5).

In step 620 of FIG. 6, a copy of the piece of digital content is created. Referring again to FIG. 5, a copy (e.g., watermarked content 504 and 505 of FIG. 5) is created that comprises the digital content (e.g., digital content 502 of FIG. 5) and a digital watermark that is embedded within the digital content. In the present invention, the digital watermark conveys the identity, which has been verified in step 610, of the recipient of the copy of the piece of digital content. In one embodiment, the digital watermark is not readily detectable by the recipient when the copy of the piece of digital content is accessed. Additionally, the digital watermark may be encrypted using the public key of the recipient to hinder efforts to identify and remove the digital watermark.

In embodiments of the present invention, the digital watermark is only embedded in a portion of the digital content rather than the entire copy of the piece of digital content. This facilitates delivering the digital content to the recipient more rapidly than conventional distribution systems. For example, the digital watermark can be embedded in an I-frame of the digital content and the B-frames and P-frames that immediately follow the watermarked I-frame. In embodiments of the present invention, some fraction of the total number of I-frames (e.g., every fiftieth I-frame) is digitally watermarked. However, the present invention may utilize as few as a single watermarked i-frame that is immediately followed by another I-frame.

Conventional distribution systems do not embed a watermark into digital content that identifies the recipient of the digital content. The present invention is advantageous to the content provider in that they can identify the source of unauthorized copies of a piece of digital content.

In step 630 of FIG. 6, a copy of the piece of digital content is delivered to the recipient. Referring again to FIG. 5, the copy of the piece of digital content (e.g., watermarked content 504 and 505 of FIG.5) is delivered to the recipient. In one embodiment, the watermarked content is delivered to the recipient using the Internet. However, a delivery method other than the Internet can be used to deliver the copy of the piece of digital content to the recipient as well.

The present invention is advantageous in that it allows a content provider to embed within a piece of digital content the information identifying an end user who is authorized to access that piece of digital content. Additionally the present invention facilitates delivery of the piece of digital content to the end user in a timely manner. Furthermore, embodiments of the present invention incorporate security measures to protect against removing the embedded information from the piece of digital content.

The preferred embodiment of the present invention, a method and system for marking digital content, is thus described. While the present invention has been described in particular embodiments, it should be appreciated that the present invention should not be construed as limited by such embodiments, but rather construed according to the following claims.

What is claimed is:

1. A method for marking digital content comprising:
   receiving a request from a user to deliver a piece of digital content to said user, wherein said piece of digital content comprises a plurality of frames;
   embedding at least one datum in said piece of digital content to generate an equivalent piece of digital content, wherein said datum is embedded in less than all of said plurality of frames, wherein said datum is embedded in one and only one intra-coded frame (I frame) of the digital content provided the one and only one I frame is immediately followed in the content by another I frame, and/or wherein said datum is embedded in every $N^{th}$ frame of the content, wherein N is an integer greater than one,
   for delivery of said equivalent piece of digital content to said user.

2. The method as recited in claim 1, wherein said embedding comprises performing a digital watermark process upon one and only one I frame of data of said piece of digital content.

3. The method as recited in claim 1, wherein said datum is embedded in every $N^{th}$ frame of the content using a watermarking process, wherein N is an integer greater than one.

4. The method as recited in claim 3 further comprising re-encoding a subsequent predicted frame (P-frame) that describes a change to said intra coded frame due to said watermarking process.

5. The method as recited in claim 3 further comprising re-encoding a subsequent bi-directional frame (B-frame) that describes a change to said intra coded frame due to said watermarking process.

6. The method as recited in claim 1, further comprising confirming the identity of said user by using a digital certificate.

7. The method as recited in claim 6, wherein said datum identifies the user and the method comprises encrypting said datum that identifies said user using a public key of said digital certificate.

8. The method as recited in claim 6, wherein said digital certificate is stored when an identity of said user is confirmed, and wherein said storing iss operable to allow other confirmed users to access said stored digital certificate.

9. The method as recited in claim 6 wherein said digital certificate comprises an expiration date.

10. The method as recited in claim 6 wherein said digital certificate comprises a digital signature of a certificate-issuing authority.

11. The method as recited in claim 1 further comprising encrypting said equivalent piece of digital content prior to delivering it to said user.

12. The method as recited in claim 1, wherein said datum identifies said user and is not readily detected by said user.

13. The method as recited in claim 1 further comprising determining that a piece of digital content is an unauthorized copy of said equivalent piece of digital content.

14. The method as recited in claim 13 wherein said determining comprises:
   identifying said user using said datum; and
   determining that said user is not authorized to copy said piece of digital content.

15. A computer system comprising:
   a bus;
   a memory unit coupled with said bus; and a processor coupled with said bus, said processor for executing a method for marking digital content comprising:

receiving a request from a user to deliver a piece of digital content to said user, wherein said piece of digital content comprises a plurality of frames;

embedding a datum in said piece of digital content to generate an equivalent piece of digital content, wherein said datum identifies said user in said equivalent piece of digital content, wherein said datum is embedded in less than all of said plurality of frames, wherein said datum is embedded in one and only one intra-coded frame (I frame) of the digital content provided the one and only one I frame is immediately followed in the content by another I frame, and/or wherein said datum is embedded in every $N^{th}$ frame of the content, wherein N is an integer greater than one.

16. The computer system of claim 15, wherein the datum is established by a digital watermark and is embedded in one and only one intra-coded frame (I frame) of the digital content of said piece of digital content.

17. The computer system of claim 16, wherein the identity of said user is verified by using a digital certificate.

18. The computer system of claim 17, wherein said digital watermark is encrypted using a public key of said digital certificate.

19. The computer system of claim 15, wherein said datum is established by a digital watermark and is embedded in every $N^{th}$ frame of the content, wherein N is an integer greater than one.

20. The computer system of claim 19, wherein a subsequent predicted frame (P-frame) that describes a change to said intra coded frame is re-encoded due to said embedding of said watermark.

21. The computer system of claim 19, wherein a subsequent bi-directional frame (B-frame) that describes a change to said intra coded frame is re-encoded due to said embedding of said watermark.

22. The computer system of claim 15, wherein said equivalent piece of digital content is encrypted prior to delivering it to said user.

23. The computer system of claim 15, wherein said datum that identifies said user is not readily detected by said user.

24. The computer system of claim 15, wherein said datum is used to determine that a second piece of digital content is an unauthorized copy of said piece of digital content.

25. The computer system of claim 24, wherein said datum is used to identify said user and wherein said user is not authorized to copy said piece of digital content.

26. A method for marking digital content comprising:

receiving a request from a recipient to deliver a piece of digital content to said recipient, wherein said piece of digital content comprises a plurality of frames, and wherein said request conveys information verifying the identity of said recipient;

creating a copy of said piece of digital content comprising: said piece of digital content; and a digital watermark embedded within said piece of digital content wherein said digital watermark is embedded in less than all of said plurality of frames, wherein said digital watermark is embedded in one and only one intra-coded frame (I frame) of the digital content provided the one and only one I frame is immediately followed in the content by another I frame, and/or wherein said digital watermark is embedded in every $N^{th}$ frame of the content, wherein N is an integer greater than one.

27. The method as recited in claim 26, wherein said creating comprises embedding said digital watermark in every $N^{th}$ frame of the content, wherein N is an integer greater than one.

28. The method as recited in claim 27 further comprising re-encoding a subsequent predicted frame (P-frame) that describes a change to said intra coded frame to account for said embedding.

29. The method as recited in claim 27 further comprising re-encoding a subsequent bi-directional frame (B-frame) that describes a change to said intra coded frame in response to said embedding.

30. The method as recited in claim 26, wherein said receiving further comprises verifying the identity of said recipient using a digital certificate.

31. The method as recited in claim 30, wherein said creating comprises encrypting said digital watermark using a public key of said digital certificate.

32. The method as recited in claim 26 further comprising encrypting said copy of said piece of digital content prior to delivering it to said recipient.

33. The method as recited in claim 26, wherein said digital watermark is not readily detected by said recipient.

34. The method as recited in claim 26 further comprising using said digital watermark to determine that a second copy of said piece of digital content is an unauthorized copy of said piece of digital content.

35. The method as recited in claim 34 wherein said determining comprises:

identifying said recipient using said digital watermark; and determining that said recipient is not authorized to copy said piece of digital content.

36. The method as recited in claim 26, wherein said plurality of frames comprises a plurality of intra coded frames (I-frames), and wherein said digital watermark is embedded in one and only one intra-coded frame (I frame) of the digital content provided the one and only one I frame is immediately followed in the content by another I frame.

* * * * *